United States Patent [19]
Hsia et al.

[11] Patent Number: 5,537,512
[45] Date of Patent: Jul. 16, 1996

[54] NEURAL NETWORK ELEMENTS

[75] Inventors: Yukun Hsia, Santa Ana; Eden Y. C. Mei, Placentia, both of Calif.

[73] Assignee: Northrop Grumman Corporation, Los Angeles, Calif.

[21] Appl. No.: 385,236

[22] Filed: Feb. 7, 1995

Related U.S. Application Data

[63] Continuation of Ser. No. 67,315, May 26, 1993, abandoned.
[51] Int. Cl.$^6$ .............................. G06E 1/00; G06F 15/18; G06G 7/00
[52] U.S. Cl. .................................. 395/24; 395/21; 395/27
[58] Field of Search .................... 395/20, 23–25, 395/27; 307/201, 301; 365/185; 257/4; 382/155–159

[56] References Cited

U.S. PATENT DOCUMENTS

| | | | |
|---|---|---|---|
| 4,153,984 | 5/1979 | Hsia | 29/577 R |
| 4,188,670 | 2/1980 | Hsia | 365/49 |
| 4,268,328 | 5/1981 | Hsia | 148/187 |
| 4,376,987 | 3/1983 | Hsia | 365/184 |
| 4,398,248 | 8/1983 | Hsia et al. | 364/200 |
| 4,454,648 | 6/1984 | Hsi | 29/576 B |
| 4,961,002 | 10/1990 | Tam et al. | 365/185 |
| 4,969,021 | 11/1990 | Thakoor et al. | 257/4 |
| 5,047,655 | 9/1991 | Chambost et al. | 395/24 |
| 5,053,638 | 10/1991 | Furutani et al. | 395/24 |
| 5,220,202 | 6/1993 | Isono et al. | 395/24 |
| 5,222,193 | 6/1993 | Brooks et al. | 395/24 |
| 5,247,606 | 9/1993 | Tam | 395/24 |

OTHER PUBLICATIONS

Yukun Hsia, "Dangling Bond Trapping Model for Si$_3$N[<i]nf4 Gate Dielectric", Symposium on Interconnect, Gate, and Dielectric Materials, Fairchild Microprocessor Division, Oct. 17, 1994, University of Santa Clara.

Yukun Hsia and Eden Y. C. Mei, "The Impact Of Processing Conditions On EPROM Asperities And Device Deprogramming" Fairchild Microprocessor Division.

Yukun Hsia, Eden Mei and Kia L. Ngai, "MNOS Retention–Endurance Characteristics Enhancement Using Graded Nitride Dielectric", presented at the 1982 International Conference on Solid State Devices, Tokyo, Japan, 1982; *Japanese Journal of Applied Physics*, vol. 22, Supplement 22–1, pp. 89–93, 1983.

Yukun Hsia, "Silicon Machine–A Reconfigurable On–The–Wafer Interconnect Architecture", *1982 GOMAC Paper*, McDonnell Douglas Corporation.

Kia L. Ngai and Yukun Hsia, "Empirical Study of the Metal–Nitride–Oxide–Semiconductor Device Characterisics Deduced From a Microscopic Model of Memory Traps", *Applied Physics Letters*, vol. 41, No. 2, pp. 150–161, Jul. 15, 1982.

(List continued on next page.)

*Primary Examiner*—David K. Moore
*Assistant Examiner*—Tariq R. Hafiz
*Attorney, Agent, or Firm*—Terry J. Anderson; Karl J. Hoch, Jr.

[57] ABSTRACT

An analog neural network element includes one or more EEPROMs as analog, reprogrammable synapses applying weighted inputs to positive and negative term outputs which are combined in a comparator. In one embodiment a pair of EEPROMs is used in each synaptic connection to separately drive the positive and negative term outputs. In another embodiment, a single EEPROM is used as a programmable current source to control the operation of a differential amplifier driving the positive and negative term outputs. In a still further embodiment, an MNOS memory transistor replaces the EEPROM or EEPROMs. These memory elements have limited retention or endurance which is used to simulate forgetfulness to emulate human brain function. Multiple elements are combinable on a single chip to form neural net building blocks which are then combinable to form massively parallel neural nets.

2 Claims, 3 Drawing Sheets

OTHER PUBLICATIONS

Yukun Hsia, Richard W. Rodgers and Roman Fedorak, "A Reconfigurable Interconnect For In–Silicon Electronic Assembly", Reprint: Proceedings, 32nd Electronic Components Conference, San Diego, CA May 10–12, 1992, IEEE, pp. 7–16, 1982.

Yukun Hsia, Gareth C. C. Chang and F. Dennis Erwin, "Adaptive Wafer Scale Integration", presented at the 1979 International Conference on Solid State Devices, Tokyo, Japan, Aug, 27–29, 1979, *Japanese Journal of Applied Physics*, vol. 19 Supp. 19–1, pp. 193–202, 1980.

Yukun Hsia, "MNOS LSI Memory Device Data Retention Measurements and Projections", *IEEE Transactions On Electron Devices*, vol. Ed–24, No. 5, May 1977.

Yukun Hsia, "Cross–Gate MNOS Memory Device", *IEEE Transactions on Electron Devices*, vol. ED–25, No. 8, Aug. 1978.

Yukun Hsia, "Application Of The Quasi–Linearization Principle In Production Circuit Design", *IEEE Transactions Of The Professional Technical Group On Circuit Theory*, vol. CT–11, No. 2, Jun. 1964.

T. F. Tao and Yukun Hsia, "Dopant Dependency Of Fermi Level Location In Heavily Doped Silicon", *Applied Physics Letters*, vol. 13, No. 9, pp. 291–292, Nov. 1, 1968.

Yukun Hsia and Folk–Hwa Wang, "Switching Waveform Prediction of a Simple Transistor Inverter Circuit", *IEEE Tranasactions On Electron Devices*, vol. ED–12, No. 12, pp. 626–631, Dec. 1965.

Yukun Hsia and K. L. Ngai, "MNOS Traps and Tailored Trap Distribution Gate Dielectric MNOS", presented at the 1979 International Conference on Solid State Defvices, Tokyo, Japan, *Japanese Journal of Applied Physics*, vol. 19, Supplement 19–1, pp. 245–248.

Sin et al, "EEPROM as an analog storage device, with particular applications in neural networks"; IEEE Transactions on Electron devices, vol. 39, iss. 6, pp. 1410–1419, Jun. 1992.

Holler et al, "An electrically trainable artificial neural network (ETANN) with 10240 'floating gate' synapses"; IJCNN, pp. 191–196 vol. 2, 18–22, Jun. 1989.

Kramer et al, "EEPROM device as a reconfigurable analog element for neural networks"; International electron devices meeting 1989. Technical Digest, pp. 259–262, 3–6 Dec. 1989.

Card et al, "EEPROM synapses exhibiting pseudo–hebbian plasticity"; Electronic Letters, vol. 25 iss. 12, pp. 805–806, 8 Jun. 1989.

Yonezu et al, "Optoelectronic adaptive neuro–device"; Electronic Letters, vol. 28, iss. 8, pp. 715–717, 9 Apr. 1992.

NEURAL NETWORK ELEMENTS

This is a continuation of application Ser. No. 08/067,315 filed on 26 May 1993 now abandoned.

BACKGROUND OF THE INVENTION

1. Field of the Invention

This invention relates to electronic neural network elements and networks configured therefrom.

2. Description of the Prior Art

Conventional neural network elements utilize digital electronic circuit technology to develop the multi-synaptic connection circuit configurations needed for the manufacture of high density neural networks. As the use of neural networks in the development of sophisticated computer systems progresses, the need for higher densities is a driving force.

Neural network elements are used as synapses in the building of networks which use massively parallel computing in emulation of the manner in which the human brain operates. What is needed are neural network elements and networks configured therefrom which provided the increasingly required higher densities and more accurately emulate the manner in which the human brain operates.

The various conventional net configurations have particular requirements which place limitations on the ability to configure neural network elements to form such nets. The Hopfield and Hamming nets, for example, require additional gain for the hard-limit threshold sigmoid functions used therein.

There are many examples of monolithic neural net devices which have been proposed in the literature. Many of these may be categorized as fixed connection devices with analog weightings, devices with digitally programmable connections and weights, and devices with analog programmable connections and weights. In this context it is important to note that the term digital does not refer to binary values, but rather to the techniques for setting these values.

One of the substantial obstacles to the development of neural net devices, particularly for the more general case of the development of a neural net device with analog programmable connections and weights, has been the difficulty in implementing sufficiently small individual synapses or connections. Conventional devices include synapses with internal digital to analog and analog to digital converters or internal digital memories and multipliers.

What are needed are flexibly configurable neural network elements which can be conveniently densely packaged while providing wide ranges of programming options, particularly analog programmable connections and weights.

SUMMARY OF THE INVENTION

Neural network elements are provided, such as metal nitride oxide semiconductor (MNOS) and floating gate electrically erasable programmable only memory (EEPROM) devices, in analog configurations which are capable of being combined in high density neural networks and provide a controllable and predictable degradation which can be used to simulate forgetfulness. In other words, the programing of each element can be made to decay at a predictable rate to better emulate the operation of the human brain. In an appropriate application, the resultant neural network may be configured to change its programming as a function of time.

In addition to emulating biological brain functions, the preprogrammed degradation or memory loss may also be useful in applications in which time factored weighting or training is desirable.

The synaptic weights stored in EEPROMs are non-volatile and therefore neural nets incorporating such elements may conveniently be stored without the need to maintain applied power. This non-volatile storage, which does not require applied power, has substantial advantage in many applications, such as neural nets stored in submunitions because such devices could be preprogrammed, saving the otherwise required overhead time for downloading the needed programming weights from other non-volatile storage medium. EEPROMs are fully reprogrammable so that new training sets of weights can be applied at any time for teaching new neural net behaviors.

In one aspect, the present invention provides a neural network element including a plurality of programmable, non-volatile analog memory elements configured as a synaptic connections, positive and negative term outputs controlled by such synaptic connections and an output circuit for combining the positive and negative term connections to produce a combined output.

These and other aspects of the invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
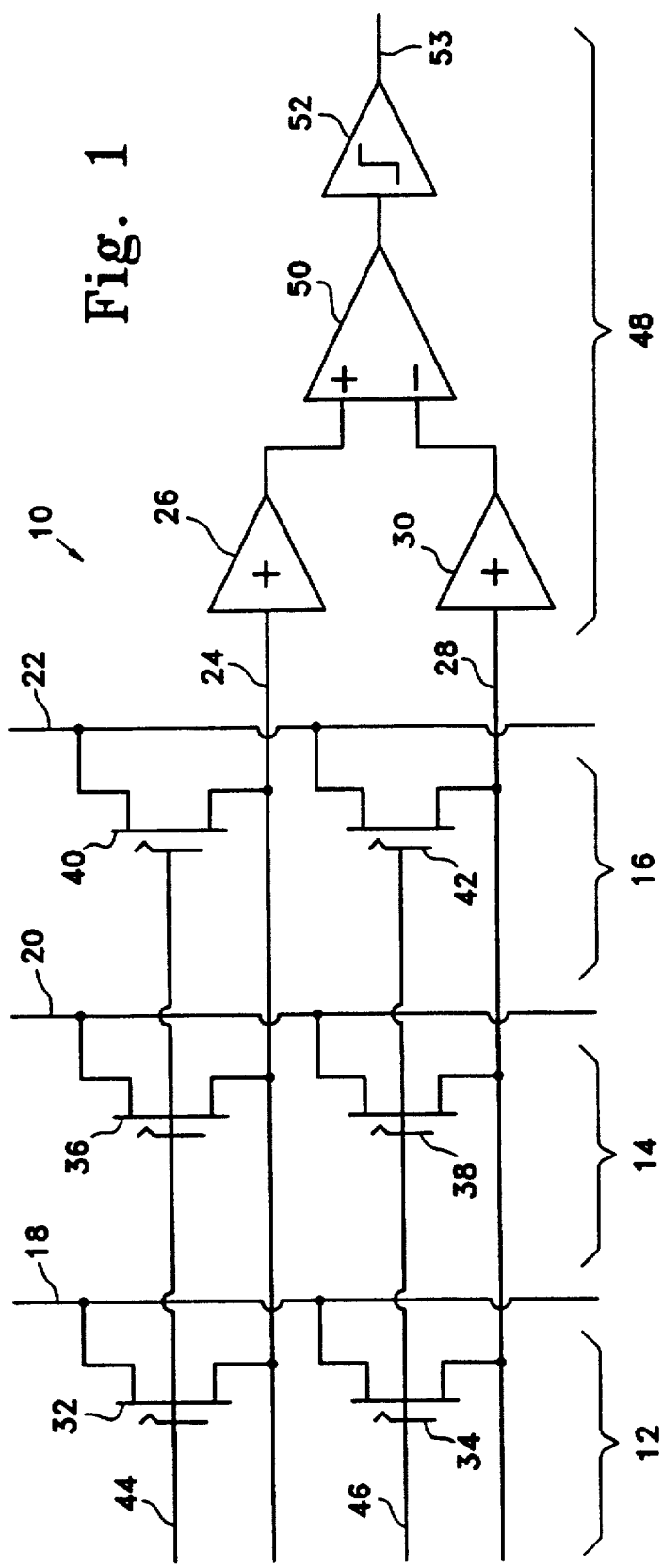
FIG. 1 is a schematic representation of a three synaptic connection circuit operable as a programmable neural network element utilizing a pair of EEPROMs per synapse, according to a first embodiment of the present invention.

FIG. 1 is a schematic representation of three synaptic connection circuit 10 operable as a programmable neural network element according to a first embodiment of the present invention. Three synaptic connection circuit 10 includes identical synapses 12, 14 and 16 receiving operating inputs 18, 20 and 22, respectively. Each synapse 12, 14 and 16 includes an EEPROM connected between its respective operating input 18, 20 or 22 and positive output term 24 which is applied to positive term buffer amplifier 26. Similarly, each synapse 12, 14 and 16 also includes an EEPROM connected between its respective operating input 18, 20 or 22 and negative output term 28 which is applied to negative term buffer amplifier 30. An EEPROM is an electrically erasable programmable read only memory which may conveniently be fabricated by known conventional mass production techniques commonly used in very large scale integrated circuit or VLSI manufacturing.

Synapse 12 includes positive term EEPROM 32 connected between operating input 18 and positive output term 24 as well as negative term EEPROM 34 connected between operating input 18 and negative output term 28. Synapse 14 includes positive term EEPROM 36 connected between operating input 20 and positive output term 24 as well as negative term EEPROM 38 connected between operating input 20 and negative output term 28. Similarly, synapse 16 includes positive term EEPROM 40 connected between operating input 22 and positive output term 24 in addition to negative term EEPROM 42 connected between operating input 22 and negative output term 28.

Each EEPROM is programmable by the charge applied to its gate electrode. The gate electrodes of positive term EEPROMs 32, 36, and 40 are connected to positive term programming input 44 while negative term EEPROMs 34, 38, and 42 are connected to negative term programming input 46 so that the magnitude of the charge applied to each EEPROM may be controlled individually.

For example, the charge applied to positive term EEPROM 32 is controlled by the relative programming biases applied to operating input 18, positive output term 24 and positive term programming input 44 while the charge applied to positive term EEPROM 36 is controlled by the relative programming biases applied to operating input 20, positive output term 24 and positive term programming input 44. Similarly, the charge applied to positive term EEPROM 40 is controlled by the relative programming biases applied to operating input 22, positive output term 24 and positive term programming input 44.

In addition, the charge applied to negative term EEPROM 34 is controlled by the relative programming biases applied to operating input 18, negative output term 28 and negative term programming input 46 while the charge applied to negative term EEPROM 38 is controlled by the relative programming biases applied to operating input 20, negative output term 28 and negative term programming input 46. Similarly, the charge applied to negative term EEPROM 42 is controlled by the relative programming biases applied to operating input 22, negative output term 28 and negative term programming input 46.

An example of the programming of three synaptic connection circuit 10 may serve to illustrate the selective programmability of this configuration. The particular example used is selected for the purpose of illustration only and is not intended to represent a likely selection of programming values. The values used for programming, and reprogramming synapses 12, 14 and 16 of three synaptic connection circuit 10, will of course depend upon the application in which they are used.

Operating inputs 18, 20 and 22 may be programmed to have positive input weighting terms of, for example, one, two and three, by applying a fixed programming bias to positive output term 24, such as ground, a programming bias typically in the range of about zero to about 5 volts to positive term programming input 44 and applying a fixed bias or selection voltage to the appropriate operating inputs such as inputs 18, 20 and 22. If the transfer function of positive term EEPROMs 32, 36, and 40 were exactly linear, the programming bias applied to positive term programming input 44 when operating input 20 was selected would be twice the bias applied when operating input 18 was selected, while the bias applied when operating input 22 was selected would be three times the programming bias applied when operating input 18 was selected.

Similarly, operating inputs 18, 20 and 22 may be programmed to alternatively or additionally have negative input weighting terms of, for example, one half, one quarter and one eighth, by applying a fixed programming bias to negative output term 28, such as ground, a programming bias in the range of about zero to about 5 volts to negative term programming input 46 and a fixed bias or selection voltage to operating inputs 18, 20 and/or 22. If the transfer function of positive term EEPROMs 34, 38, and 42 were exactly linear, the programming bias applied to negative term programming input 46 when operating input 20 was selected would be one half the programming bias applied when operating input 18 was selected while the programming bias applied when operating input 22 was selected would be one quarter of the programming bias applied when operating input 18 was selected.

The actual values, and signs, of the selection and/or programming biases to be applied to operating inputs 18, 20 and 22, positive and negative output terms 24 and 28, and positive and negative term programming inputs 44 and 46 depend upon the characteristics of the physical EEPROMs with which three synaptic connection circuit 10 is implemented. Such transfer characteristics are well known and to some extent may be controlled during the integrated circuit manufacturing process used to implement three synaptic connection circuit 10.

In addition to synapses 12, 14 and 16, three synaptic connection circuit 10 includes output stage 48 in which the outputs of positive and negative term buffer amplifiers 26 and 30 are combined in comparator 50, the output of which may conveniently be detected by threshold detector 52 to improve the accuracy of three synaptic connection circuit 10 by rejecting noise below a preselected threshold level during the production of neural network element output 53. In other words, output stage 48 provides both buffering and programmable output gain and is configured as a differential current summing circuit. Thus, both positive and negative weights are reflected in neural network element output 53 by the magnitude of the current flowing therethrough for each synaptic connection.

In the described example, the positive terms for operating inputs 18, 20 and 22 are factored or weighted in the ratio of one, two, or three while the negative terms therefor are weighted as one half, one quarter and one eighth during the programming of neural network element output 53. An input value of one applied to operating input 18 would therefore result in neural network element output 53 having a value of one minus one half, that is, a positive one half. An input value of one applied to operating input 20 would therefore result in neural network element output 53 having a value of two minus one quarter, that is, a value of positive one and three quarters. Similarly, an input value of one applied to operating input 22 would yield neural network element output 53 equal to three minus one eighth, that is, a value of positive two and seven eighths. Input values of one simultaneously applied to operating inputs 18 and 20 would yield a value for neural network element 53 of one half plus one and three quarters or two and one quarter while inputs applied simultaneously to all three operating inputs 18, 20 and 22 would produce neural network element output 53 having a value of five and one eighth.

As can easily be seen from the above example in which each of the positive and negative terms of three synaptic connection circuit 10 were programmed to different values, three synaptic connection circuit 10 as shown in FIG. 1 may conveniently be used as a reprogrammable analog neural network element for use in VLSI neural network arrays. In operation of such neural nets or arrays, the input value applied to any particular operating input would not necessarily have a value of one, but would rather typically be the output of another neural network element. That is, neural network element output 53 would typically be applied to one operating input of one or more other neural network elements, not shown.

Figure 2:
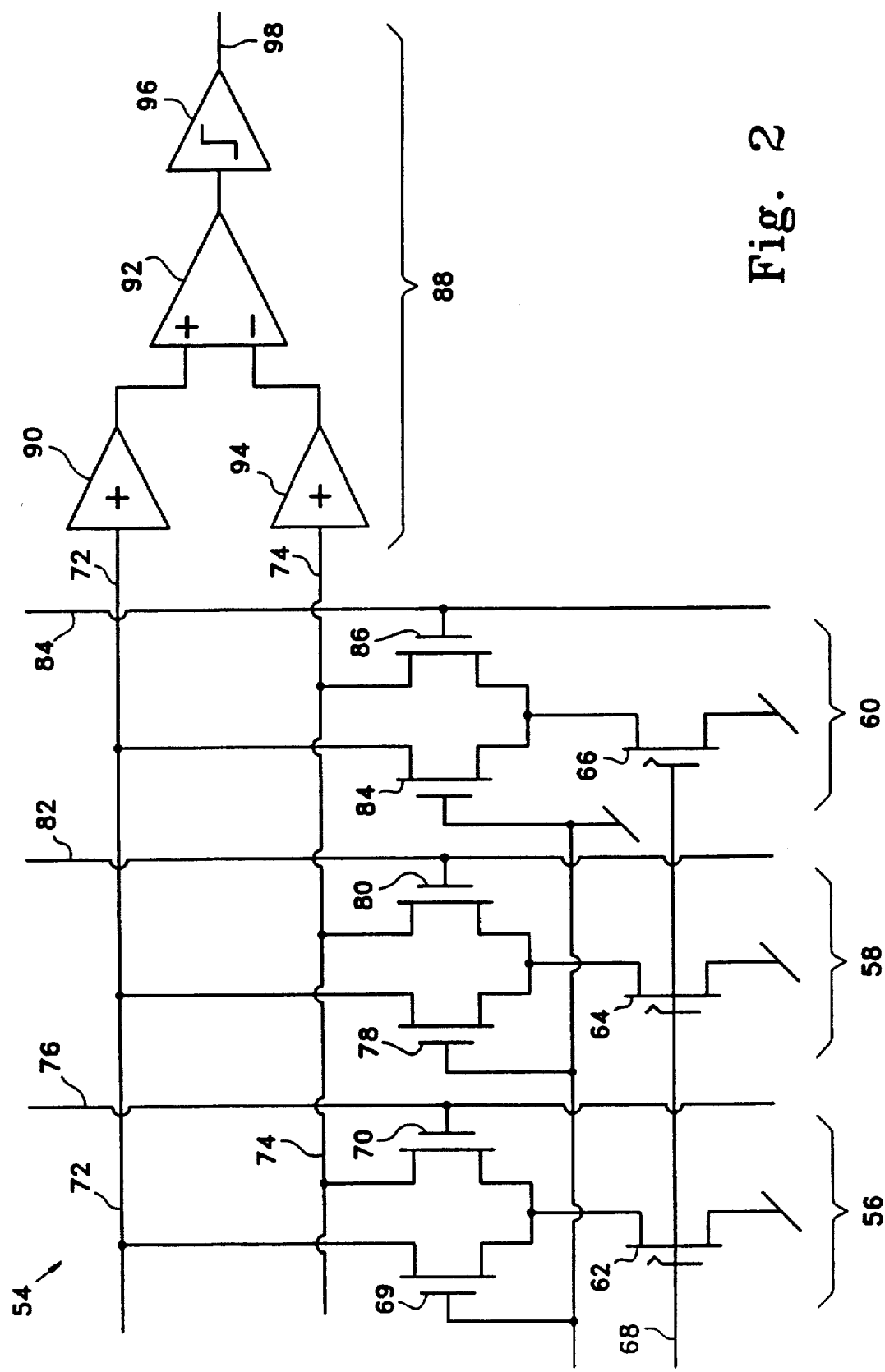
FIG. 2 is a schematic representation of a three synaptic connection circuit operable as a programmable neural network element utilizing a single EEPROM and a pair of MOS transistors, according to a second embodiment of the present invention.

Referring now to FIG. 2, an alternate embodiment of a neural network element according to the present invention is shown in a schematic representation of three synaptic connection circuit 54 which is operable as a programmable neural network element utilizing a single EEPROM and a pair of MOS transistors. In particular, three synaptic connection circuit 54 includes synapses 56, 58 and 60 each configured with a single EEPROM, such as EEPROM current sources 62, 64, and 66, respectively. The programmable threshold voltage of a conventional EEPROM, on the order of about 0 to 5 volts, is used to provide a programmable drain current that is used as the weight for the input signal of the synaptic connection.

The drain of each such EEPROM current source 62, 64, and 66 is connected to ground while the gate of each such EEPROM current source is connected to programming line 68. The source connection of each such EEPROM current source is connected to the common connection of a differential pair of MOS transistors. The gate lead of one MOS transistor of each pair is tied to a predetermined programming bias, such as ground, while the gate lead of the other MOS transistor in each pair is connected to one of the operating input lines. In each such MOS transistor pair, the remaining lead of one MOS transistor is connected to the positive output term while the remaining lead of the other MOS transistor is connected to the negative output term.

In particular, synapse 56 includes EEPROM 62 connected between ground and the common connection between MOS transistors 69 and 70 which are tied to positive and negative output terms 72 and 74, respectively. The gate lead of MOS transistor 69 is tied to ground while the gate lead of the other MOS transistor 70 synapse 56 is tied to operating input 76. In synapse 58, EEPROM current source 64 is connected between ground and the common connection between MOS transistors 78 and 80 which are tied to positive and negative output terms 72 and 74, respectively. The gate lead of MOS transistor 78 is tied to ground while the gate lead of MOS transistor 80 is tied to operating input 82. Similarly, in synapse 60, EEPROM current source 66 is connected between ground and the common connection between MOS transistors 84 and 86 which are tied to positive and negative output terms 72 and 74, respectively. The gate lead of MOS transistor 84 is tied to ground while the gate lead of the MOS transistor 86 is tied to operating input 84.

Output stage 88 of three synaptic connection circuit 54 is similar to output stage 48 of the neural network element embodiment shown in FIG. 1. In particular, positive output term 72 is applied to positive term buffer amplifier 90, the output of which is applied as the positive input to comparator 92. Similarly, negative output term 74 is applied to negative term buffer amplifier 94, the output of which is applied as the negative input to comparator 92. The output of comparator 92 is then applied to threshold detector 96 to produce neural network element output 98.

The transfer function of three synaptic connection circuit 54 is determined by the interaction of the input circuit including one or more synapses activated by application of an appropriate input to the corresponding operating input and output stage 88. The input stage, which provides basic signal buffering, has built-in signal range saturation. The synaptic connection may therefore provide the actual sigmoidal characteristics required by the neural network element in a particular application. Because the reference voltage applied to the differential circuit may be programmed or adjusted, the sigmoidal function can also be offset by arbitrary amounts. Output stage 88 is a programmable gain stage and may be utilized to provide additional gain for hard-limit threshold sigmoid functions, such as those in Hopfield or Hamming type neural networks.

In the operation of each synapse shown in FIG. 2, the EEPROM current source transistor of that synapse is programmed to provide a specific current, while the MOS transistor pair are arranged as a differential transistor pair with one input tied to a reference voltage. In the example shown in FIG. 2, this reference voltage is ground. The input or gate lead of the other MOS transistor of each pair is tied to the appropriate operating input so that the differential voltage applied between positive and negative output terms 72 and 74 is a weighted replica of the value of the input applied to the operating input.

The EEPROM current source transistors of each synapse may be separately programmed. The current produced by each EEPROM current source is determined by the programming bias applied to programming line 68 when that EEPROM current source is properly selected by applying a fixed programming bias to negative output term 74 and the appropriate operating input. Alternatively, a fixed bias may be applied to programming line 68 and the programming bias applied to the appropriate operating input. For example, EEPROM current source 62 in synapse 56 may be selected for programming by applying a fixed bias to operating input 76 and a slightly higher fixed bias to negative output term 74 so that MOS transistor 70 is biased to conduct and apply current through EEPROM current source 62 in response to the programming bias applied to programming line 68. EEPROM current source 64 in synapse 58 may be selected for programming by applying a fixed bias to operating input 82 and a slightly higher fixed bias to negative output term 74 so that MOS transistor 80 is biased to conduct and apply current through EEPROM current source 64 in response to the programming bias applied to programming line 68. Similarly, EEPROM current source 66 in synapse 60 may be selected for programming by applying a fixed bias to operating input 84 and a slightly higher fixed bias to negative output term 74 so that MOS transistor 86 is biased to conduct and apply current through EEPROM current source 66 in response to the programming bias applied to programming line 68.

After appropriate programming of synapses 56, 58 and 60 as described above, the values of the inputs applied to operating inputs 76, 82 and 84 are weighted by the programmed current produced by EEPROMs 62, 64 and 66 respectively to produce various differential voltages between positive and negative output terms 72 and 74. The differential voltages produced by all such synapses are combined, after appropriate buffering in positive and negative term buffer amplifiers 90 and 94, in comparator 92 to produce neural network element output 98 at the output of threshold detector 96. The magnitude of the weighted differential voltage output produced by each such synapse is a function of the value applied to the corresponding operating input and the preprogrammed current produced by the EEPROM current source. That is, the differential output applied to comparator 92 for each synapse is proportional to the input voltage applied to the operating input and the gain of the differential MOS gain stage. The gain of the MOS transistor pair is inversely proportional to the programmed threshold.

An additional benefit provided by the configuration of three synaptic connection circuit 54 shown in FIG. 2, is the ability to individually disable each synaptic connection. For example, synapse 56 may be disabled by programming EEPROM current source 62 so that the threshold is higher than the bias voltage. Neither MOS transistor of the MOS transistor differential gain stage will supply current so that the synaptic weight is conveniently set at zero weighting, thereby effectively disabling that synaptic connection.

Three synaptic connection circuit 54 therefore not only provides the capability to emulate various sigmoidal functions and neural net algorithms, but provides a convenient platform for evaluating the dynamic behavior of analog neural nets.

In addition, in order to provide different thresholds for use in training neural network elements, three synaptic connection circuit 54 provides arbitrary programming voltages. The convenience of the electrical erasability of the various EEPROM transistors, both the transistor pairs used in each synapse in the embodiment shown in FIG. 1 as well as the EEPROM current source transistor used in each synapse in the embodiment shown in FIG. 2, simplifies the training of three synaptic connection circuits 10 and 54. It is important to note that in this regard the ability to conveniently move the individual thresholds in either a positive or negative direction greatly enhances training ease, flexibility and convenience. In a practical application, the threshold value in each such EEPROM will not likely experience many equivalent complete erase/write cycles, probably on the order of not more than ten such cycles in its operating life. There should therefore be little danger of exceeding the endurance limit of the EEPROM device used in neural network elements 10 and 54.

Another potentially useful advantage of the use of EEPROMs for programming the weightings in such neural net elements is that although they are capable of retaining their programming for many years, each EEPROM does not have the retention of other devices which may be similarly used, such as an EPROM or electrically programmable read only memory. That is, EPROMs are not only not electrically erasable but provide better retention of the programming value stored therein. The reduced retention of EEPROMs however may be utilized to provide substantial benefits, particularly in simulating human brain behavior, because such EEPROMs may be used to simulate forgetfulness. That is, as the lower retention qualities of EEPROMs comes into play and the programming weightings of each synapse lessens with time, the gradually reducing threshold provides a time factored reprogramming in the same way that human brains do not easily remember thoughts after a long period of time, particularly if such thoughts have not been reinforced or were not highly weighted at the time of the original programming.

Figure 3:
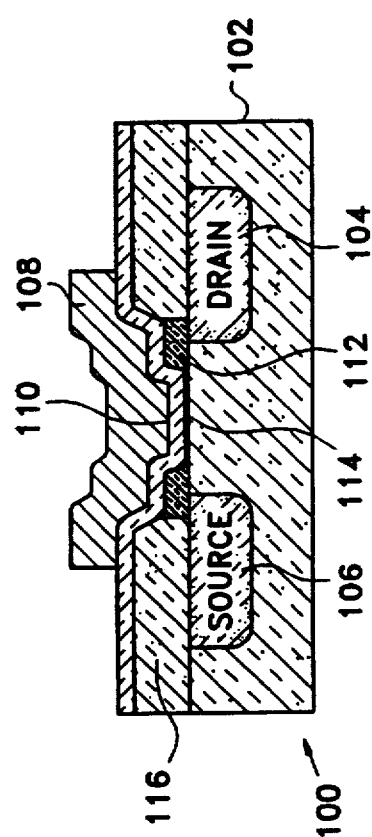
FIG. 3 is a cross sectional view of an PINOS transistor operable as a programmable neural network memory element according to a further embodiment of the present invention.

Referring now to FIG. 3, a cross sectional view of MNOS memory transistor 100 is shown. MNOS memory transistor 100 is advantageously operable as a programmable neural network memory element according to another embodiment of the present invention replacing the EEPROMs used in above described embodiments. Metal nitride oxide silicon or MNOS transistor technology is known and used for the fabrication of memory transistors on epitaxial silicon wafers.

Various alternative structures for non-volatile MNOS semiconductor memory devices are known as described for example in an article by one of the inventors hereof entitled "Cross-Gate MNOS Memory Device" published in the IEEE TRANSACTIONS ON ELECTRON DEVICES, VOL. ED-25, NO. 8, AUGUST 1978, pp 1071–2. Techniques for fabricating such MNOS memory devices are also shown, for example, in U.S. Pat. No. 4,153,984 issued on May 15, 1979 to one of the inventors hereof for "METHOD OF FABRICATING AN MNOS MEMORY DEVICE".

The memory retention characteristics of MNOS memory devices have been studied as described for example in an article by one of the inventors hereof entitled "MNOS LSI Memory Device Data Retention Measurements and Projections" published in the IEEE TRANSACTIONS ON ELECTRON DEVICES, VOL. ED-24, NO. 5, MAY 1977, pp 568–71. Models of the memory traps in MNOS devices have been developed as shown for example in the article by one of the co-inventors hereof entitled "MNOS Traps and Tailored Trap Distribution Gate Dielectric MNOS" published in the Proceedings of the 11th Conference on Solid State Devices, Tokyo, 1979, pp 245–48.

MNOS devices may be combined with electronic devices fabricated by other techniques on the same silicon wafers as shown in U.S. Pat. No. 4,268,328 issued on May 19, 1981 to one of the inventors hereof for a "STRIPPED NITRIDE MOS/MNOS PROCESS" and in U.S. Pat. No. 4,454,648, issued on Jun. 19, 1984 to one of the inventors hereof for a "METHOD OF MAKING INTEGRATED MNOS AND CMOS DEVICES IN A BULK SILICON WAFER".

The retention and endurance characteristics of MNOS memory transistors has been studied, and enhanced, as described for example in an article by the inventors hereof entitled "MNOS Retention-Endurance Characteristics Enhancement Using Graded Nitride Dielectric" published in the proceedings of the 14th Conference on Solid State Devices, Tokyo 1982, pp 89–93.

Referring now to FIG. 3, MNOS memory transistor 100 is formed on a portion of silicon substrate 102 and includes drain and source electrodes 104 and 106, respectively, formed therein by doping in accordance with conventional techniques. Gate electrode 108, typically configured from aluminum, is positioned above silicon substrate 102 covering the space between drain and source electrodes 104 and 106 but separated therefrom by silicon nitride 110 and gate oxide 112. At the closest separation between gate electrode 108 and silicon substrate 102, gate oxide 112 is narrowed to form memory dielectric area 114. In a typical configuration, field oxide 116 is provided between silicon nitride 110 and drain and source electrodes 104 and 106.

As noted above, one of the unique characteristics of MNOS memory transistors is the limited retention or duration of data storage. This characteristic may be advantageously utilized in neural net elements in accordance with the present invention to simulate the forgetfulness or need for retraining inherent in physical neural net embodiments such as the human brain. By substituting MNOS memory transistor 100 for the memory elements in the above described embodiments, an enhanced operation neural net element may be provided in which the simulated forgetfulness may more easily be controlled by the design of the memory element. In particular, MNOS memory transistor 100 may be replicated to replace positive term EEPROMs 32, 36, and 40 and negative term EEPROMs 34, 38, and 42 in three synaptic connection circuit 10 shown in FIG. 1 or EEPROM current sources 62, 64 and 66 shown in FIG. 2.

Figure 4:
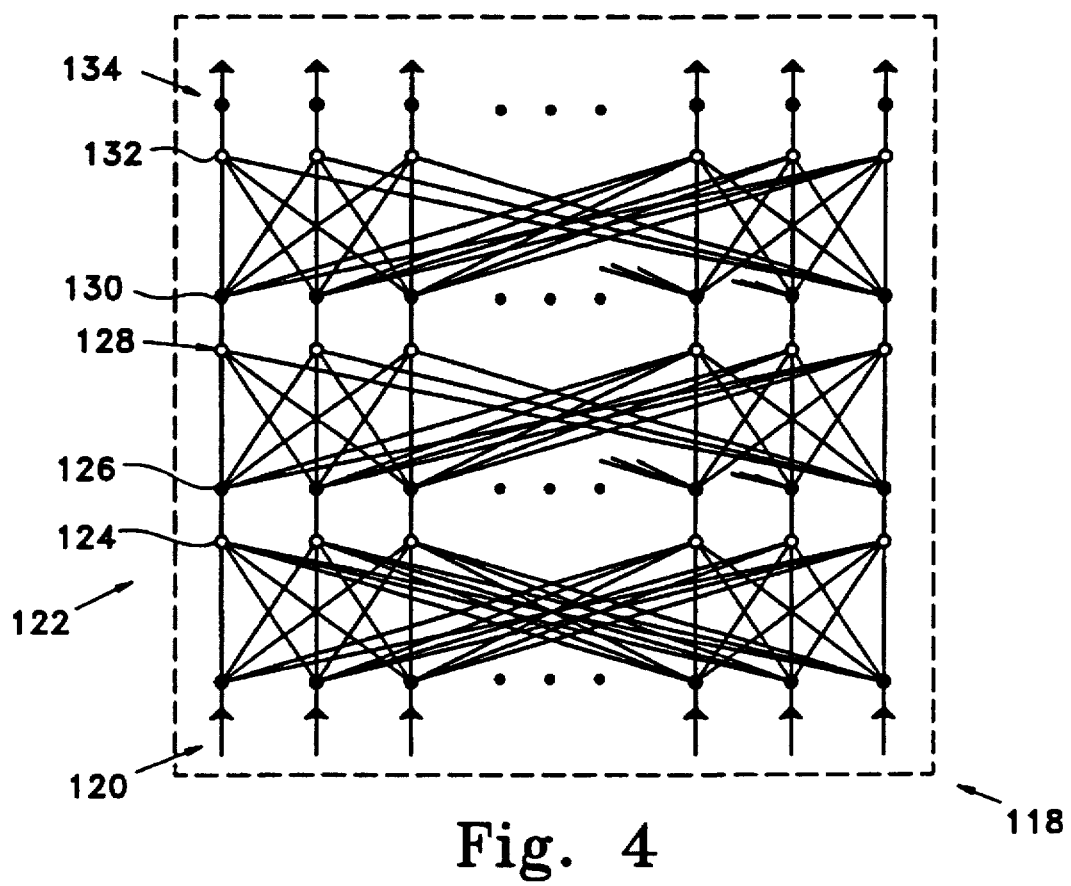
FIG. 4 is a block diagram illustration of a building block element for use in a neural network utilizing a plurality of interconnected neural network elements, of the types shown in FIG. 1 through 3, according to another embodiment of the present invention.

Referring now to FIG. 4, a block diagram illustration is shown of neural net building block 118 for use in a neural network utilizing a plurality of interconnected neural network elements of the types shown in FIG. 1 through 3 according to another embodiment of the present invention. In accordance with current production density for the fabrication of conventional EEPROMs, it is reasonable to expect that on the order of at least 1,024,000 synaptic connections may be conveniently provided on a single integrated circuit or IC chip.

In particular, row inputs 120 represent a row of inputs to neural net building block 118, each of which is connected to a synaptic connection of one of the multi-synaptic connection circuits illustrated as synapse connection row 122, which includes for example neural element 124. Neural element 124 may be configured from three synaptic connection circuit 10, as shown in FIG. 1, or a multi-synaptic version thereof, from three synaptic connection circuit 54 as shown in FIG. 2, or a multi-synaptic version thereof, or from a multi-synaptic connection circuit configured with other memory elements such as MNOS memory transistor 100 shown in FIG. 3. In any event, each input in row inputs 120 is connected to one of the synaptic inputs of a neural element in synapse connection row 122.

The outputs of each of the neural elements in synapse connection row 122 are shown for clarity in output row 126 which, as shown, are used to connect the outputs of synapse connection row 122 as inputs to hidden synapse connection row 128. Row 128 is called a hidden row to emphasize the fact that direct input/output or I/O connections from the neural elements in row 128 need not necessarily be provided in order to improve density. That is, although the I/O connections for the neural elements synapse connection row 122 between neural net building block 118 and other components may be provided in part by row inputs 120, there may be no direct I/O connections between neural net building block 118 and other components for the neural net elements in hidden synapse connection row 128. The programming and/or training of the neural elements in hidden synapse connection row 128 may be accomplished by means of output row 126.

In a similar manner, the outputs of each of the neural elements in hidden synapse connection row 128 are shown for clarity in hidden output row 130 which, as shown, is used to connect the outputs of hidden synapse connection row 128 as inputs to synapse connection row 132 which are connected to output row 134 of neural net building block 118. Synapse connection row 132 is not a hidden row in that direct I/O connections from the neural elements in row 132 are made between neural net building block 118 and other components by means of output row 134.

Figure 5:
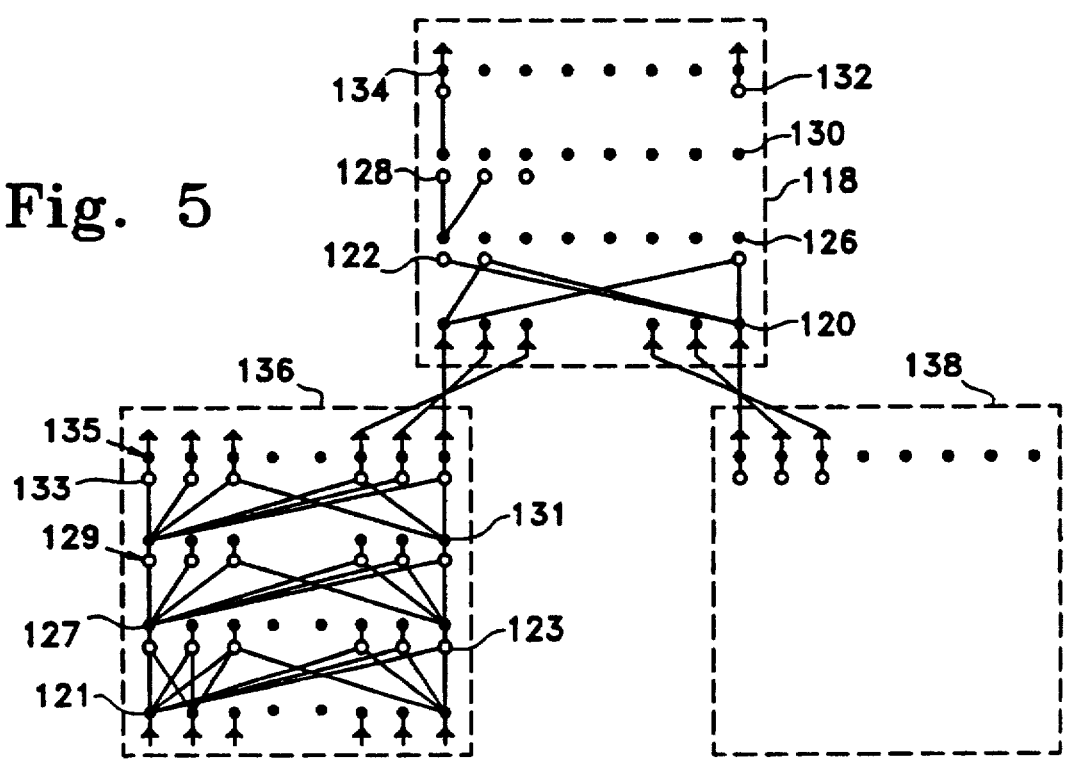
FIG. 5 is a block diagram schematic illustration of the interconnection of three of the building block elements shown in FIG. 4 for use in a high density neural network according to the present invention.

A series of neural net building blocks, such as neural net building block 118 shown in FIG. 4, may be connected together to form a larger neural net for specific applications as illustrated in FIG. 5 which is a block diagram schematic illustration of the interconnection of three such building blocks in the implementation of a very high density, larger neural network according to the present invention. In particular, neural net building block 118 is shown together with similar or preferably identical building blocks 136 and 138 which are used to process the synaptic inputs applied to row inputs 120 of neural net building block 118. This configuration illustrates the applicability of neural net building blocks as provided by the present invention for the implementation of massively parallel multilayer neural networks.

Because building blocks 136 and 138 are preferably identical, it is only necessary to describe the operation of building block 136. Building block 136 is substantially identical to neural net building block 118 as well as block 138. Building block 136 includes row inputs 121, synapse connection row 123, output row 127, hidden synapse connection row 129, hidden output row 131, synapse connection row 133 and output row 135 which operate in the same manner as row inputs 120, synapse connection row 122, output row 126, hidden synapse connection row 128, hidden output row 130, synapse connection row 132 and output row 134 of neural net building block 118.

It will be appreciated by persons skilled in the art that the present invention is not limited to what has been shown and described hereinabove, nor the particular details of the circuits described. The scope the invention is, rather, limited solely of by the claims, which follow.

What is claimed is:

1. A neural network element, comprising:

two analog memory elements each characterized by being programmable and non-volatile and each having gate, source, and drain electrodes, each said analog memory element being configured as a synaptic connection;

an analog operating input having either a positive or a negative value connected to said drain electrodes of said analog memory elements;

a first analog programming input connected to said gate electrode of said first analog memory element;

a second analog programming input connected to said gate electrode of said second analog memory element;

an analog positive term output controlled by said source electrode of said first analog memory element;

an analog negative term output controlled by said source electrode of said second analog memory element, and output means for combining said positive and negative term outputs, comprising:

a positive term buffer amplifier connected to said single analog positive term output, said positive term buffer amplifier outputting a positive buffer output, a negative term buffer amplifier connected to said single analog negative term output, said negative term buffer amplifier outputting a negative buffer output, and a comparator connected to said positive and negative term buffer amplifiers and receiving said positive and negative buffer outputs as positive and negative inputs, respectively, said comparator outputting a comparator output.

2. A neural network element, comprising:

two analog memory elements each characterized by being programmable and non-volatile and each having gate, source, and drain electrodes, each said analog memory element being configured as a synaptic connection;

an analog operating input having either a positive or a negative value connected to said drain electrodes of said analog memory elements;

a first analog programming input connected to said gate electrode of said first analog memory element;

a second analog programming input connected to said gate electrode of said second analog memory element;

an analog positive term output controlled by said source electrode of said first analog memory element;

an analog negative term output controlled by said source electrode of said second analog memory element, and output means for combining said positive and negative term outputs, comprising:
- a positive term buffer amplifier connected to said single analog positive term output, said positive term buffer amplifier outputting a positive buffer output,
- a negative term buffer amplifier connected to said single analog negative term output, said negative term buffer amplifier outputting a negative buffer output,
- a comparator connected to said positive and negative term buffer amplifiers and receiving said positive and negative buffer outputs as positive and negative inputs, respectively, said comparator outputting a comparator output, and,
- a threshold detector connected to said comparator and receiving said comparator output as a detector input, said threshold detector outputting said single analog neural network element output.

* * * * *